(12) United States Patent
Syed et al.

(10) Patent No.: US 8,597,160 B2
(45) Date of Patent: Dec. 3, 2013

(54) METHOD AND SYSTEM FOR CONTROLLING AN ENGINE

(75) Inventors: Fazal Urrahman Syed, Canton, MI (US); Mathew Alan Boesch, Plymouth, MI (US); Venkatapathi Raju Nallapa, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 13/192,033

(22) Filed: Jul. 27, 2011

(65) Prior Publication Data

US 2013/0029806 A1    Jan. 31, 2013

(51) Int. Cl.
*B60W 10/04* (2006.01)
*F02D 9/06* (2006.01)
*G06F 19/00* (2011.01)

(52) U.S. Cl.
USPC ............ 477/184; 477/203; 477/206; 701/102

(58) Field of Classification Search
USPC .......... 477/184, 203, 205, 206; 701/102, 103, 701/110
See application file for complete search history.

(56) References Cited

U.S. PATENT DOCUMENTS

| | | | |
|---|---|---|---|
| 4,866,623 A * | 9/1989 | Ise et al. .......................... 701/85 |
| 6,283,559 B1 | 9/2001 | Yamada et al. |
| 6,305,757 B1 | 10/2001 | Ohsaki et al. |
| 6,321,716 B1 | 11/2001 | Mashiki et al. |
| 6,346,064 B1* | 2/2002 | Hada et al. ..................... 477/171 |
| 6,773,374 B2 | 8/2004 | Ogawa et al. |
| 2010/0004844 A1* | 1/2010 | Hirooka ......................... 701/102 |
| 2010/0036566 A1 | 2/2010 | Hayami |
| 2011/0231077 A1* | 9/2011 | Nakamura .................... 701/102 |

\* cited by examiner

*Primary Examiner* — Roger Pang
(74) *Attorney, Agent, or Firm* — Julia Voutyras; Alleman Hall McCoy Russell & Tuttle LLP

(57) ABSTRACT

An engine with a fast vacuum recovery brake booster system is disclosed. In one example, an actuator is adjusted in response to a flow between the brake booster and an engine intake manifold. Operation of the engine and vehicle brakes may be improved especially when the engine is boosted.

20 Claims, 5 Drawing Sheets

METHOD AND SYSTEM FOR CONTROLLING AN ENGINE

BACKGROUND/SUMMARY

Enhanced engine controls have provided increased functionality as emissions and performance demands have increased. For example, electrically controlled throttles have improved vehicle drivability and improved engine emissions via adjusting a position of an engine throttle so as to adjust air flow to the engine so that fuel delivery can be matched more closely to air delivery to engine cylinders. However, electrically controlled throttles may receive torque demands from several inputs including from an operator of a vehicle. Further, the controls that adjust the throttle position may also receive other inputs that may have requirements that may be inconsistent or different from the inputs that contribute to the determination of throttle position. For example, some operators may choose to operate a vehicle using both of their feet. In particular, some operators may simultaneously depress an accelerator and a vehicle brake actuator to control vehicle speed through a corner or curve. Consequently, the vehicle controller may simultaneously receive inputs to accelerate and decelerate the vehicle. Driving a vehicle via simultaneously commanding the vehicle to accelerate and decelerate may make it more difficult to ensure that the operator has a desired level of control to accelerate and decelerate the vehicle. Specifically, it may be challenging to provide vacuum to actuate vehicle brakes to decelerate the vehicle as well as to provide engine torque to smoothly accelerate the vehicle after the vehicle brakes are at least partially released.

The inventors herein have recognized the above-mentioned limitations and have developed a method for operating an engine, comprising: reducing a desired engine torque in response to application of a vehicle brake during a condition where a requested engine torque is greater than a threshold level; and adjusting a rate the desired engine torque is increased after the vehicle brake is released in response to an operating condition while the requested engine torque is substantially constant.

By reducing engine torque during application of a vehicle brake, engine intake manifold pressure may be lowered so as to provide braking assistance to an operator such that vehicle braking force may be increased even though torque may still be output from the engine. In addition, by adjusting the rate of engine torque increase while the requested engine torque is substantially constant, vehicle acceleration may be controlled so as to provide smooth and predictable vehicle acceleration after braking.

The present description may provide several advantages. For example, the approach may provide improved braking assistance to a driver. Further, the approach can improve vehicle acceleration after vehicle brakes are released. Further still, the approach can prioritize vehicle acceleration and deceleration requests from an operator.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
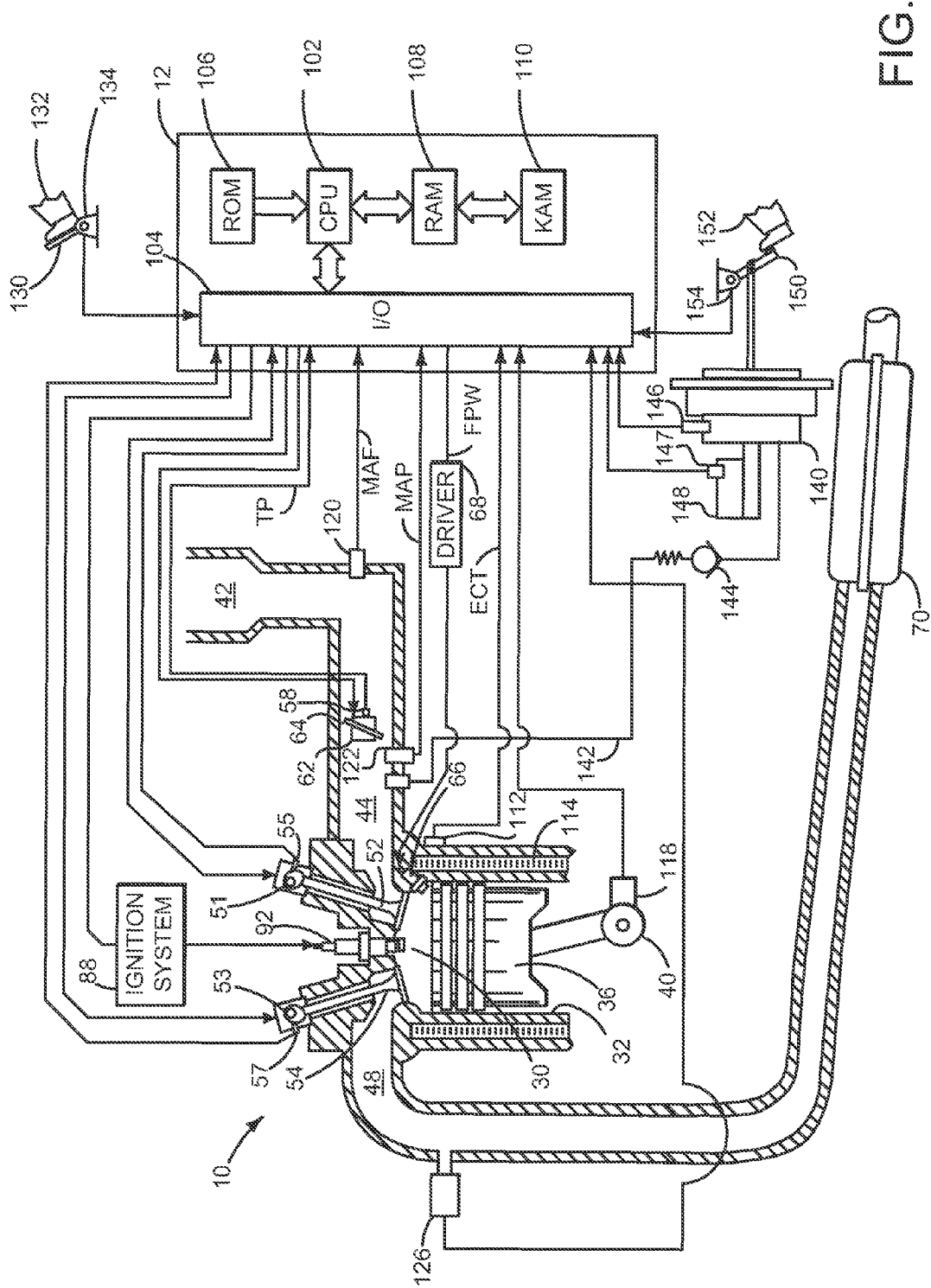
FIG. 1 shows a schematic depiction of an engine.
Figure 2:
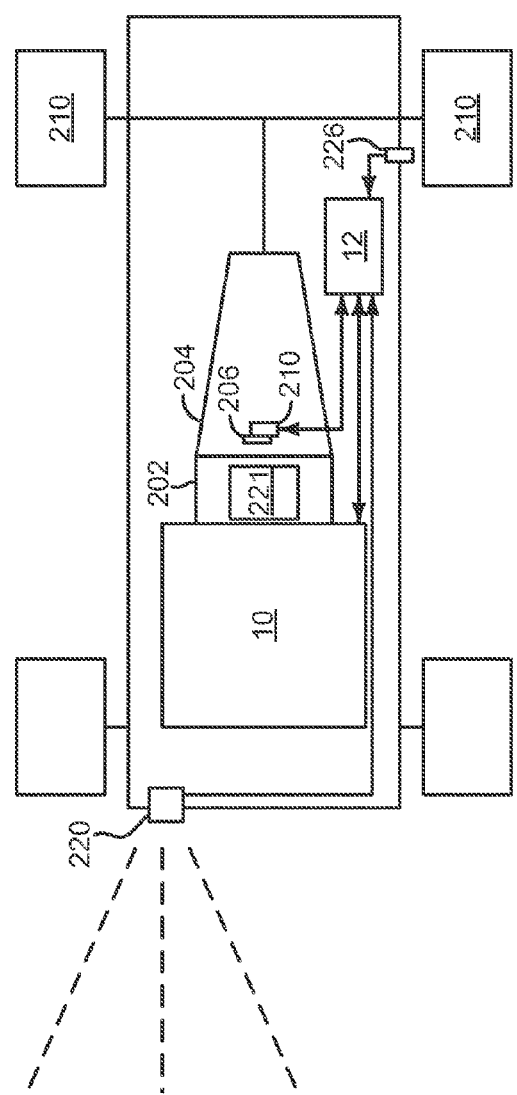
FIG. 2 shows a schematic depiction of a vehicle including the engine of FIG. 1.
Figure 3:
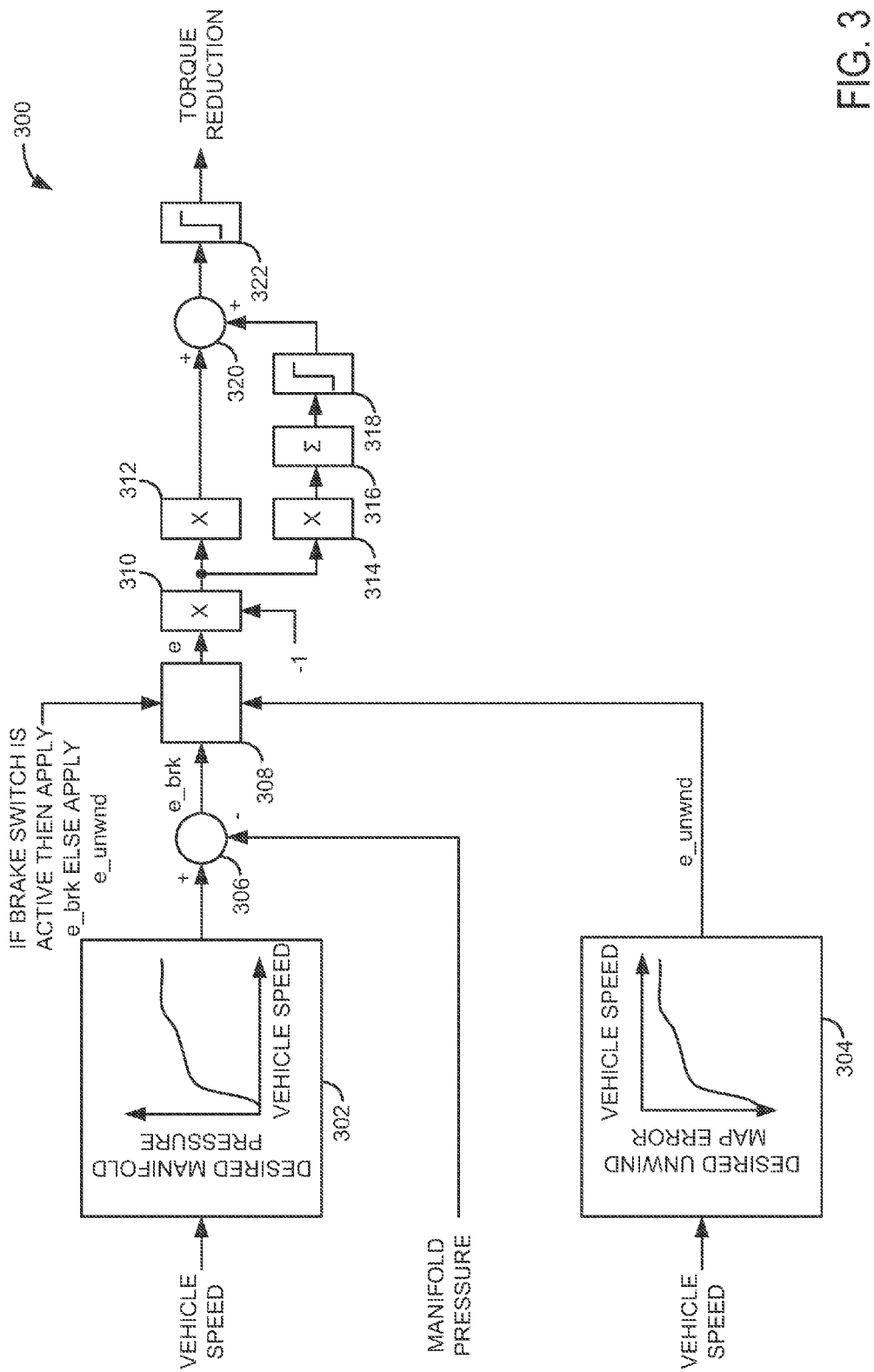
FIG. 3 shows a block diagram of an engine torque control method.
Figure 4:
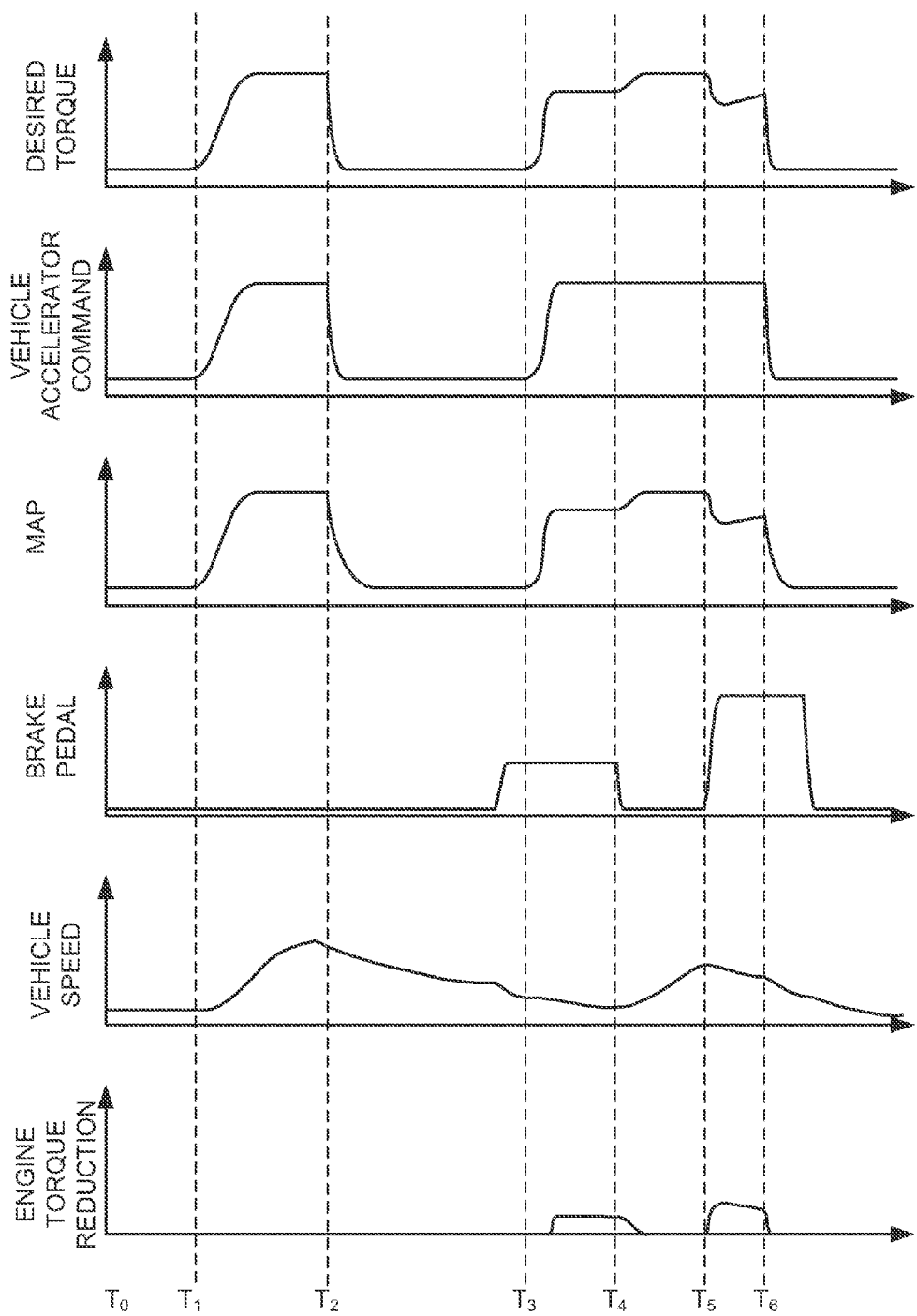
FIG. 4 shows a prophetic operating sequence.
Figure 5:
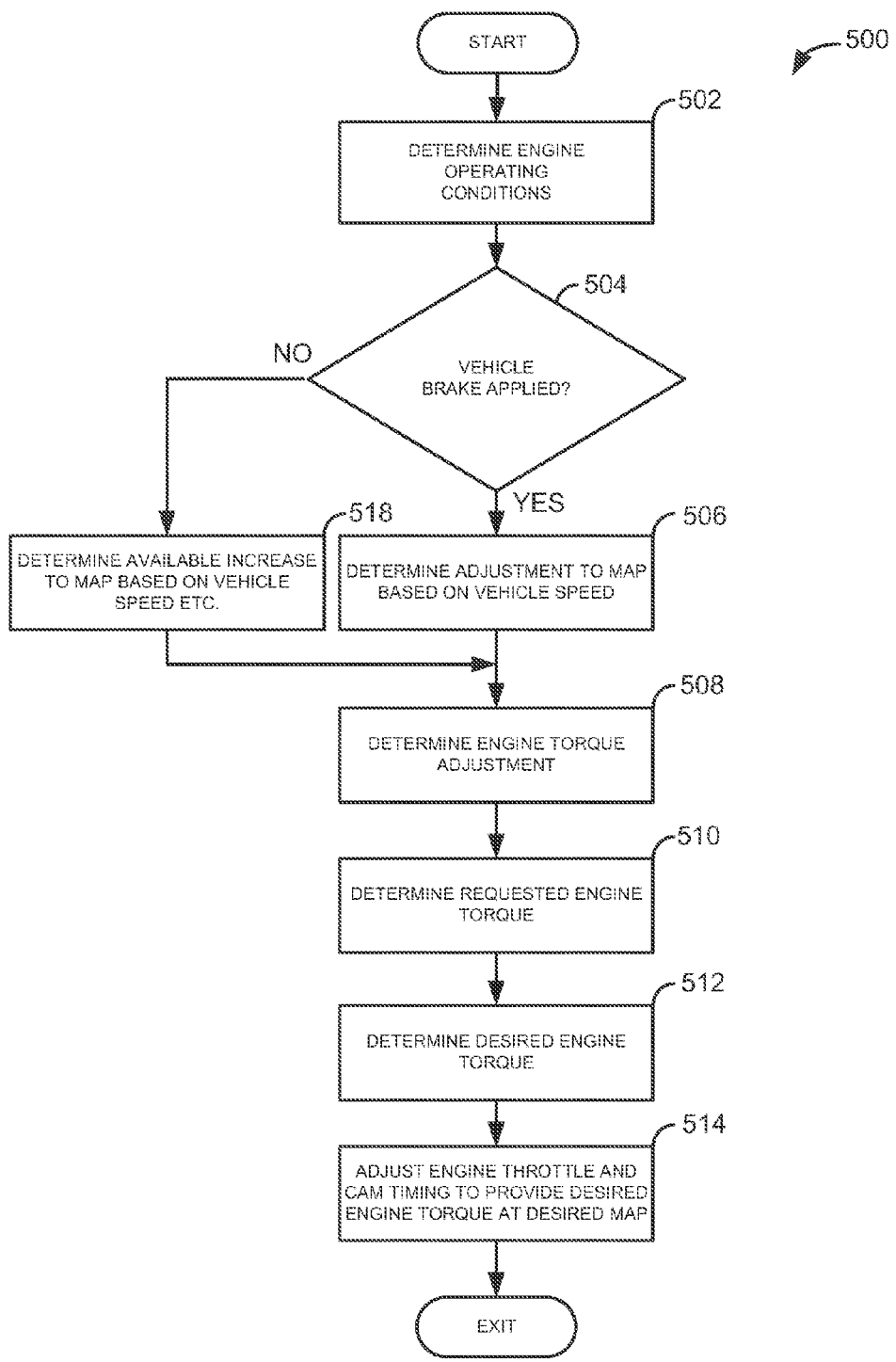
FIG. 5 shows a flowchart of an example method for operating an engine.

The present description is related to controlling an engine. In one example, engine torque is adjusted during an operator initiated vehicle braking event so as to decrease intake manifold pressure so that braking assistance may be provided to the operator. FIG. 1 shows one example of an engine and brake booster system. FIG. 2 shows an example of an engine in a vehicle. A control block diagram of one example engine torque control method is shown in FIG. 3. The torque control method of FIG. 3 provides for controlling engine torque during a vehicle braking event as well as after a vehicle brake is released. An example vehicle braking sequence where engine torque is controlled is illustrated in FIG. 4. Finally, a method for controlling engine torque to provide the sequence of FIG. 4 is shown in FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from engine air intake 42. Intake manifold 44 also provides vacuum to brake booster 140 via conduit 142. Check valve 144 ensures air flows from brake booster 140 to intake manifold 44 and not from intake manifold 44 to brake booster 140. Brake booster 140 amplifies force provided by foot 152 via brake pedal 150 to master cylinder 148 for applying vehicle brakes (not shown).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position, a pressure sensor 146 for sensing brake booster vacuum; a pressure sensor 147 for sensing master cylinder pressure (e.g., hydraulic brake pressure); a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a schematic depiction of a vehicle including the engine of FIG. 1 is shown. Vehicle 200 includes engine 10 coupled to a transmission 204 via a torque converter 202. Engine 10 provides torque to vehicle wheels 210 via transmission 204. Controller 12 receives signals from and provides control signals to engine 10 and transmission 204. Controller 12 also actuates gears 206 that are selectable via clutches 210. Controller 12 may also receive signals from object sensor 220 and torque converter lock-up clutch 221 during operation. In one example, object sensor 220 may be an optical transmitter and receiving sensor. In other examples, object sensor 220 may transmit and receive sound waves. Object sensor 220 provides a distance from the vehicle to an object external from the vehicle (e.g., another vehicle). Vehicle speed may be sensed via vehicle speed sensor 226.

Thus, the systems of FIGS. 1 and 2 provide for an engine including an air intake with a throttle; an accelerator; a brake actuator; and a controller including instructions to reduce engine torque in response to application of the brake actuator during a condition where a position of the accelerator does not indicate a reduction of engine torque, the controller including additional instructions to increase engine torque after the brake actuator is released in response to a speed of a vehicle in which the engine operates. Thus, the controller can account for requests to accelerate and decelerate a vehicle at the same time. The engine system further comprises an electrically controlled throttle, and where the controller includes additional instructions for increasing and decreasing engine torque via adjusting a position of the electrically controlled throttle. The engine system further comprises an adjustable camshaft, and where the controller includes additional instructions for increasing and decreasing engine torque via adjusting a position of the adjustable camshaft. The engine system also includes where the controller includes further instructions for summing an error between a desired engine intake manifold pressure and an actual engine intake manifold pressure to determine an engine torque reduction amount. The engine system also includes where the controller includes further instructions for determining an engine torque increase based on a vehicle speed. The engine system further includes where the controller includes further instructions for decreasing engine torque in response to a change in position of the accelerator.

Referring now to FIG. 3, a block diagram of an engine torque control method is shown. Method 300 receives inputs of MAP and vehicle speed. Further, in some examples, method 300 may also receive inputs of transmission gear, torque converter clutch state, and object detection data. Method 300 is executable via instructions within a controller 12 as is shown in FIGS. 1 and 2.

At 302, method 300 indexes a table or function via a sensed vehicle speed. A desired engine intake manifold absolute pressure (MAP) is output from the table or function. The desired engine intake MAP may be empirically determined and stored in the table or function. In one example, the desired engine intake MAP is a pressure that can provide brake assistance to an operator to decelerate a vehicle at a desired rate. In one example, the desired engine MAP decreases as vehicle speed increases so as to provide additional vehicle braking assistance to an operator as vehicle speed increases. In this way, additional braking force may be provided to the vehicle brakes. The output from the table or function is directed to summing junction 306.

At summing junction 306, actual MAP is subtracted from desired engine intake MAP to provide an error signal e_brk. The error signal e_brk is then directed to 308.

At 304, method 300 indexes a table or function via a sensed vehicle speed. A desired unwind engine intake (MAP) error amount is output from the table or function. The unwind engine intake error amount is a variable that increases engine torque via increasing engine intake MAP after MAP has been reduced to provide braking assistance to an operator while the vehicle brake and accelerator are actuated simultaneously. The desired unwind engine intake MAP error amount may be empirically determined and stored in the table or function. In one example, the desired unwind engine intake MAP error amount is an error value that can increase engine torque at a rate that provides smooth vehicle acceleration after vehicle brakes are released. In other examples, additional dimensions may be provided to the table so that the desired unwind engine intake MAP error amount can be adjusted in response to a distance between the vehicle and objects in front or behind the vehicle. Further, the desired unwind engine intake MAP error amount can be adjusted in response to the state of the torque converter clutch and/or the presently selected gear of a transmission coupled to the engine. For example, in a first condition where the engine is coupled to a transmission and where the transmission is in a gear that is a lower gear while the torque converter is unlocked, the desired unwind engine intake MAP error amount may be a first amount to improve vehicle acceleration after a brake pedal is released. Since the method of FIG. 3 may be executed at selected time intervals, the amount of desired unwind engine intake MAP error adjusts the rate at which desired torque and MAP are increased. However, during a second condition, if the torque converter is locked and the transmission is in the same gear as during the first condition, the desired unwind engine intake MAP error amount may be reduced so that the increase in engine torque is less apparent to the operator so as to improve vehicle drivability. Thus, torque transferred from the engine to the vehicle wheels can be controlled based on torque converter state so that torque impulses through vehicle driveline are less noticeable.

Similarly, in a first condition where the engine is coupled to a transmission and where the transmission is in a gear that is a lower gear while the torque converter is unlocked, the desired unwind engine intake MAP error amount may be a first amount to improve vehicle acceleration after a brake pedal is released. However, during a second condition, if the transmission is in a higher gear and the torque converter is unlocked, the desired unwind engine intake MAP error amount may be increased as compared to during the first condition so that vehicle acceleration may be improved. Since the transmission is in a higher gear, the increased rate at which engine torque is increased may be less apparent to the operator. The output from the table or function at 304 is directed to 308.

At 308, an inquiry of the vehicle brake switch is made to determine whether or not the vehicle brake is applied. If the vehicle brake is applied, the value e_brk is passed to 310. Otherwise, if the vehicle brake is not applied, the value e_unwnd is passed to 310. When e_brk is passed to 310, engine torque may be reduced or increased depending on whether e_brk is positive or negative. If e_brk is positive, MAP can be increased to increase engine torque. If e_brk is negative, MAP can be reduced to decrease engine torque. MAP and engine torque can be increased when e_unwnd is passed to 310. The output of 308 is shown as e and is the basis for limits at 318.

At 310, the value passed from 308 is multiplied by −1 to change the sign of the value passed to 310. In other examples, 310 may be eliminated by changing the operations at 306 and the values at 304. The output from 310 is passed to 312 and 314.

At 312, method 300 multiplies the value passed from 310 by a gain term. Thus, a proportional adjustment is made to the value passed from 310. The gain adjusted value is supplied to summing junction 320 from 312.

At 314, method 300 multiples the value passed from 310 by a second gain term. The gain adjusted value is supplied to 316 where the gain adjusted value is added to other gain adjusted values from previous executions of method 300 such that the output from 314 is numerically integrated at 316. The output of 316 is directed to 318 where it may be limited between a maximum value defined by 0−(e*$K_{pe}$), where $K_{pe}$ is the output of 312, and a minimum value defined by −TE_Cal_Min− (e*$K_{pe}$), where TE_Cal_Min is an empirically determined calibration constant. In this way, the engine torque adjustment is an accumulated adjustment. The output of 318 is directed to summing junction 320.

At summing junction 320, method 300 adds output from 312 and 318. Summing junction passes the result to 322. The output from summing junction 320 is limited at 322. In one example, a maximum value of zero may pass from 322 to a calculation of desired engine torque. Further, a minimum value defined by a calibration constant TE_Cal_Min may be empirically determined and used to limit the output of 322.

Thus, the method of FIG. 3 provides for determining an adjustment to a desired engine torque. The adjustment to desired engine torque takes into account whether or not a vehicle brake is depressed, vehicle speed, selected transmission gear, distance between vehicle and objects, and torque converter operating state. The adjustment to desired engine torque is used to determine desired engine torque and to set the position of a camshaft and throttle to provide the desired engine torque.

Referring now to FIG. 4, a prophetic operating sequence is shown. The sequence may be provided via the methods of FIGS. 3 and 5 being executed by controller 12 of FIGS. 1 and 2.

The first plot from the top of FIG. 4 represents desired engine torque versus time. Desired engine torque increases in the direction of the Y axis arrow. The X axis represents time and time increases from left to right.

The second plot from the top of FIG. 4 represents vehicle accelerator command versus time. Vehicle accelerator command increases in the direction of the Y axis arrow. The X axis represents time and time increases from left to right.

The third plot from the top of FIG. 4 represents engine intake MAP versus time. Engine intake MAP increases in the direction of the Y axis arrow. Thus, intake manifold vacuum increases in a direction opposite the Y arrow. The X axis represents time and time increases from left to right.

The fourth plot from the top of FIG. 4 represents brake pedal depression versus time. Brake pedal depression increases in the direction of the Y axis arrow. The X axis represents time and time increases from left to right.

The fifth plot from the top of FIG. 4 represents vehicle speed versus time. Vehicle speed increases in the direction of the Y axis arrow. The X axis represents time and time increases from left to right.

The sixth plot from the top of FIG. 4 represents engine torque reduction versus time. Engine torque reduction increases in the direction of the Y axis arrow. For example, desired engine torque is reduced more when the engine torque reduction increases in the direction of the Y axis arrow. The X axis represents time and time increases from left to right.

At time $T_0$, desired engine torque and the vehicle accelerator command are at lower levels. The engine MAP is also at a lower level so that engine torque output is at a lower level. The vehicle brake pedal has not been applied and the vehicle speed is at a relatively low level. The engine torque reduction amount is low since the vehicle brake is not applied.

At time $T_1$, the vehicle accelerator command is increased and the desired engine torque increases with the vehicle accelerator command. The vehicle accelerator command may be an input to determining the desired torque amount. However, the desired torque amount may be adjusted to account for other engine torque demands as well as engine torque reduction requests. Engine intake MAP increases as desired engine torque increases so that the engine may deliver the desired engine torque. Engine intake MAP may be adjusted via adjusting the engine intake throttle and/or intake valve timing via adjusting camshaft phase. The vehicle brake pedal is not depressed at time $T_1$ and so the vehicle speed increases as desired torque increases. No torque reduction is present at time $T_1$ since the vehicle brake is not depressed.

At time $T_2$, the vehicle accelerator command decreases and the desired engine torque is reduced accordingly. Engine MAP is also reduced as air is pumped from the engine intake manifold via engine pistons. Engine MAP is reduced at a rate that is lower than the rate desired engine torque decreases because of the time it takes to pump air from the engine intake manifold. Vehicle speed begins to decrease as desired engine torque decreases because the engine torque output is not sufficient at time $T_2$ to sustain the vehicle speed. No torque reduction is present at time $T_2$ since the vehicle brake is not depressed.

Between time $T_2$ and time $T_3$, vehicle speed continues to decrease and the brake pedal is depressed. However, no engine torque reduction is present because engine MAP is at a lower level.

At time $T_3$, the vehicle accelerator command increases and desired engine torque increases with the vehicle accelerator command. The vehicle brake pedal continues to be actuated at time $T_3$. When engine intake MAP reaches a threshold level based on vehicle speed the torque reduction amount increases, thereby causing the desired torque level to be reduced even though the vehicle accelerator command is at a high level. The engine intake MAP reaches a level less than atmospheric pressure so that vacuum may be provided to the brake booster to assist the operator applying the vehicle brakes. In this way, engine intake MAP and engine torque are limited so as to provide force to assist the operator applying vehicle brakes while at the same time providing engine torque. In some examples, the force applied to vehicle brakes is a level that causes the vehicle to slow down at a desired rate even though torque is supplied from the engine to vehicle wheels. Thus, in some examples, the force applied to vehicle brakes exceeds engine torque applied to vehicle wheels.

At time $T_4$, the vehicle brake pedal is released. As a result, the engine torque reduction is reduced at a predetermined rate based on vehicle speed and other variables (e.g., transmission gear, vehicle distance to object, torque converter clutch state). In other words, the engine torque can be increased after the brake is released at a rate that is related to vehicle speed, transmission gear, torque converter clutch state, and vehicle distance to an object. As a result, desired engine torque and engine MAP increase even though the vehicle accelerator command is substantially constant.

At time $T_5$, the vehicle brake is reapplied. The desired engine torque is reduced since engine intake MAP is greater than a threshold torque that is based on vehicle speed. Engine MAP decreases as desired engine torque increases. By reducing engine torque and MAP additional assistance may be provide the operator to slow the vehicle. Since vehicle speed is higher at time $T_5$, desired engine torque can be reduced further so as to increase vehicle braking force. Between time $T_5$ and time $T_6$, desired engine torque increases as vehicle speed decreases; however desired engine torque increases at a lower rate such that vehicle braking force continues to exceed engine torque even when vehicle speed reaches zero.

At time $T_6$, the vehicle accelerator command is reduced while at the same time the vehicle brake pedal continues to be actuated. Desired engine torque is reduced as the engine accelerator command is reduced. And, since engine intake MAP is reduced to a level less than a desired MAP that is based on vehicle speed, the engine torque reduction is reduced. In particular, desired engine torque is allowed to increase since engine MAP is low and engine torque reduction goes to zero; however, the vehicle accelerator command is low so the engine torque stays low.

Thus, FIG. 4 shows that desired engine torque is not affected until the vehicle brake is depressed. Further, the rate at which engine torque is allowed to increase after the vehicle brake is released may be based on vehicle speed, torque converter clutch state, selected transmission gear, and distance of vehicle to an object.

Referring now to FIG. 5, a flowchart of an example method for operating an engine is shown. Method 500 is executable via instructions of controller 12 of FIGS. 1 and 2. Further, method 500 may provide the sequence of FIG. 4.

At 502, method 500 determines vehicle and engine operating conditions. Operating conditions may include but are not limited to engine speed, vehicle speed, desired engine torque, vehicle accelerator command, distance between vehicle and objects, transmission gear, torque converter clutch state, MAP, and engine coolant temperature. Method 500 proceeds to 504 after operating conditions are determined.

At 504, method 500 judges whether or not a vehicle brake request is present. For example, method 500 judges whether or not a vehicle brake is depressed. If so, method 500 proceeds to 506. If not, method 500 proceeds to 514.

At 506, method 500 determines an adjustment to engine intake MAP based on vehicle speed. In one example, method 500 determines an adjustment to engine intake MAP as described at 306 of FIG. 3. In particular, vehicle speed is a basis for indexing a table or function that outputs a desired engine intake MAP based on vehicle speed. In one example, the desired engine MAP may decrease as engine speed increases so as to provide additional assistance to the vehicle operator when vehicle speed is higher. Actual engine intake MAP is subtracted from desired engine intake MAP to provide an adjustment to engine intake MAP. In this way, engine intake MAP may be reduced via closing a throttle and retarding or advancing valve timing during a vehicle braking event to increase brake application assistance for the vehicle operator. Method 500 proceeds to 508 after an adjustment to engine intake MAP is determined.

At 518, method 500 determines an available increase to MAP that is available based on vehicle speed and other variables (e.g., transmission gear, torque converter clutch lock-up state, distance between vehicle and an object). In one example, the available increase to MAP is determined according to and as described at 304 of FIG. 3. In particular, a desired unwind of engine intake MAP is determined so that MAP can be increased in relation to the desired unwind amount. For example, a multi-dimension table may be indexed via vehicle speed, torque converter clutch state, transmission gear, and distance between vehicle and an object to provide a desired unwind of engine intake MAP. The values of table cells may be empirically determined and stored in controller memory. In one example, the rate desired engine torque is increased is greater as vehicle speed decreases. Method 500 proceeds to 508 after the available increase to MAP is determined.

At 508, method 500 determines the engine torque adjustment. In one example, the engine torque adjustment is determined according to the block diagram of FIG. 3. Specifically, if a vehicle brake is actuated, the engine torque adjustment can decrease engine intake MAP and engine torque based on vehicle speed. On the other hand, if the vehicle brake is not actuated, the engine torque adjustment can increase engine intake MAP and engine torque based on vehicle speed and other variables (e.g., transmission gear, torque converter clutch lock-up state, distance between vehicle and an object). Engine intake MAP and engine torque may be adjusted via a proportional/integral controller as shown in FIG. 3. The control terms may be expressed as:

$$T_{e\_iterm}(n) = \begin{cases} (-e \times K_{pe}); & \left(T_s K_{ie} \sum_{i=0}^{n} e(i)\right) > (-e \times K_{pe}) \\ T_s K_{ie} \sum_{i=0}^{n} e(i); & \begin{array}{l}(-TE\_Cal\_Min - e \times K_{pe}) \leq \\ \left(T_s K_{ie} \sum_{i=0}^{n} e(i)\right) \leq (-e \times K_{pe})\end{array} \\ (-TE\_Cal\_Min - e \times K_{pe}); & \left(T_s K_{ie} \sum_{i=0}^{n} e(i)\right) < \\ & (-TE\_Cal\_Min - e \times K_{pe}) \end{cases}$$

Where Te_iterm(n) is the integral portion of the engine torque adjustment, e is an engine intake MAP error based on vehicle speed and actual MAP, Kpe is proportional gain term, Ts is a time between samples and routine execution, TE_Cal_Min is a calibration constant, and Kie is an integral gain term. The proportional gain term may be expressed as:

$$T_{e\_pterm}(n) = e \times K_{pe}$$

The engine torque reduction amount $T_{e\_reduction}$ may be expressed as:

$$T_{e\_reduction}(n) = \begin{cases} 0; & (T_{e\_pterm} - T_{e\_iterm}) > 0 \\ T_{e\_pterm} - T_{e\_iterm}; & \begin{array}{l} TE\_Cal\_Min \leq \\ (T_{e\_pterm} - T_{e\_iterm}) \leq 0 \end{array} \\ TE\_Cal\_Min; & \begin{array}{l}(T_{e\_pterm} - T_{e\_iterm}) < \\ TE\_Cal\_Min\end{array} \end{cases}$$

In this way, engine torque and engine MAP may be adjusted to provide vehicle braking force assistance while also providing engine torque to vehicle wheels. Method 500 proceeds to 510 after the engine torque adjustment is determined.

At 510, method 500 determines a requested engine torque. In one example, a requested engine torque may be a sum of several engine torques including operator requested torque (e.g., brake torque), engine torque adjustment from 508, engine pumping torque, engine friction torque, and engine accessory torque. Operator requested brake torque may be determined via indexing a table based on a voltage output from an accelerator pedal sensor. In one example, engine friction torque and engine pumping torque may be determined according to the following equations:

$$\Gamma_{friction} = \frac{FMEP \cdot V_D}{4 \cdot \pi} \cdot \frac{N/m^2}{(1 \cdot 10^{-5} \text{bar})}$$

$$\Gamma_{pumping} = \frac{PMEP \cdot V_D}{4 \cdot \pi} \cdot \frac{N/m^2}{(1 \cdot 10^{-5} \text{ bar})}$$

$$PMEP = C_0 + C_1 \cdot V_{IVO} + C_2 \cdot V_{EVC} + C_3 \cdot V_{IVC-IVO} + C_4 \cdot N$$

$$FMEP = C_0 + C_1 \cdot N + C_2 \cdot N^2$$

Where VD is cylinder displacement volume, where FMEP is engine cylinder friction mean effective pressure, where PMEP is engine cylinder pumping mean effective pressure, $C_0$-$C_4$ are regressed coefficients, $V_{IVO}$ is cylinder volume at intake valve opening, $V_{EVC}$ is cylinder volume and exhaust valve closing, $V_{IVC}$ is cylinder volume at intake valve closing, and N is engine speed. Engine accessory torque may be empirically determined and stored in a table that is indexed by engine speed. Method 500 proceeds to 514 after desired engine torque is determined.

At 514, method 500 adjusts engine throttle and cam phase to provide a desired amount of engine torque. In one example, cam phase may be adjusted via supplying oil to a cam phase actuator. The cam phase and throttle position are based on an engine air amount that produces the desired engine torque at stoichiometric air-fuel conditions. In one example, the desired engine torque and engine speed index a table that outputs a desired engine air amount. The desired engine air amount and engine speed index another table or function that relates engine intake manifold pressure to engine air charge. The table or function may include a series of straight lines that account for different cam phase angles and intake manifold pressures. The straight line representing a cam angle where engine volumetric efficiency is greater than a threshold level when the engine is operating with the desired air charge is selected and the cam is driven to the angle. The engine throttle is adjusted based on MAP feedback from the MAP sensor to the MAP value where the desired cylinder air charge is provided to the engine. Method 500 proceeds to exit after the camshaft and throttle positions are adjusted.

Thus, the methods of FIGS. 3 and 5 provide for operating an engine, comprising: reducing a desired engine torque in response to application of a vehicle brake during a condition where a requested engine torque is greater than a threshold level; and adjusting a rate the desired engine torque is increased after the vehicle brake is released in response to an operating condition while the requested engine torque is substantially constant. In this way, vehicle control may be improved when a vehicle is simultaneously commanded to accelerate and decelerate. Further, since more braking force may be provided than engine torque during vehicle braking, vehicle braking may be given higher priority than vehicle acceleration. The method includes where the threshold level is an engine idle torque amount. The method includes where reducing the desired engine torque includes reducing a pressure of an engine intake manifold via closing a throttle of an air intake system of the engine. The method also includes where the operating condition is a vehicle speed.

The methods of FIGS. 3 and 5 also include where the rate the desire engine torque is increased is greater as vehicle speed decreases. The method also includes where the desired engine torque is reduced in response to application of the vehicle brake at a rate that is based on a value of a sum of error between a desired engine intake manifold vacuum and an actual engine intake manifold vacuum. The method further includes where the value of the sum is reduced at a rate based on vehicle speed when the vehicle brake is released.

The methods of FIGS. 3 and 5 also provide for operating an engine, comprising: reducing engine torque via adjusting a throttle position and a camshaft position in response to vehicle brake application during a condition where a requested engine torque is greater than a threshold level; and adjusting a rate the engine torque is increased based on vehicle speed via adjusting the throttle position and the camshaft position in response to releasing the vehicle brake. The method includes where the camshaft is retarded to reduce the engine torque. The method also includes where the camshaft is advanced to reduce the engine torque. The method also includes where the engine torque is increased in response to a speed of a vehicle. The method also includes where the engine torque is increased via decreasing an accumulated engine torque adjustment.

The methods of FIGS. 3 and 5 also include where reducing the engine torque includes reducing a pressure of an engine intake manifold via closing a throttle of an air intake system of the engine. The method also includes where the engine torque is reduced in response to application of the vehicle brake at a rate that is based on a value of a sum of error between a desired engine intake manifold vacuum and an actual engine intake manifold vacuum.

As will be appreciated by one of ordinary skill in the art, the method described in FIGS. 3 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine, comprising:
reducing a desired engine torque in response to application of a vehicle brake during a condition where a requested engine torque is greater than a threshold level; and
adjusting a rate the desired engine torque is increased after the vehicle brake is released in response to an operating condition while the requested engine torque is substantially constant.

2. The method of claim 1, where the threshold level is an engine idle torque amount.

3. The method of claim 1, where reducing the desired engine torque includes reducing a pressure of an engine intake manifold via closing a throttle of an air intake system of the engine.

4. The method of claim 1, where the operating condition is a vehicle speed.

5. The method of claim 4, where the rate the desired engine torque is increased is greater as vehicle speed decreases.

6. The method of claim 1, where the desired engine torque is reduced in response to application of the vehicle brake at a rate that is based on a value of a sum of error between a desired engine intake manifold vacuum and an actual engine intake manifold vacuum.

7. The method of claim 6, where the value of the sum is reduced at a rate based on vehicle speed when the vehicle brake is released.

8. A method for operating an engine, comprising:
reducing engine torque via adjusting a throttle position and a camshaft position in response to vehicle brake application during a condition where a requested engine torque is greater than a threshold level; and
adjusting a rate at which engine torque is increased based on vehicle speed via adjusting the throttle position and the camshaft position in response to vehicle brake release.

9. The method of claim 8, where the camshaft position is retarded to reduce engine torque.

10. The method of claim 8, where the camshaft position is advanced to reduce engine torque.

11. The method of claim 8, where engine torque is increased in further response to a transmission gear.

12. The method of claim 11, where engine torque is increased via decreasing an accumulated engine torque adjustment.

13. The method of claim 8, where reducing engine torque includes reducing a pressure of an engine intake manifold via closing a throttle of an air intake system of the engine.

14. The method of claim 8, where engine torque is reduced in response to vehicle brake application at a rate that is based on a value of a sum of error between a desired engine intake manifold vacuum and an actual engine intake manifold vacuum.

15. An engine system, comprising:
an engine including an air intake with a throttle;
an accelerator;
a brake actuator; and
a controller including instructions to reduce engine torque in response to application of the brake actuator during a condition where a position of the accelerator does not indicate a reduction of engine torque, the controller including additional instructions to increase a rate engine torque is increased after the brake actuator is released in response to a speed of a vehicle in which the engine operates.

16. The engine system of claim 15, further comprising an electrically controlled throttle, and where the controller includes additional instructions for increasing and decreasing engine torque via adjusting a position of the electrically controlled throttle.

17. The engine system of claim 15, further comprising an adjustable camshaft, and where the controller includes additional instructions for increasing and decreasing engine torque via adjusting a position of the adjustable camshaft.

18. The engine system of claim 15, where the controller includes further instructions for summing an error between a desired engine intake manifold pressure and an actual engine intake manifold pressure to determine an engine torque reduction amount.

19. The engine system of claim 18, where the controller includes further instructions for determining an engine torque increase based on the speed of the vehicle.

20. The engine system of claim 15, where the controller includes further instructions for decreasing engine torque in response to a change in the position of the accelerator.

* * * * *